UNITED STATES PATENT OFFICE.

PAUL G. L. G. DESIGNOLLE, OF PARIS, FRANCE.

IMPROVEMENT IN TREATMENT OF MINERAL PHOSPHATES.

Specification forming part of Letters Patent No. 196,881, dated November 6, 1877; application filed October 13, 1877.

*To all whom it may concern:*

Be it known that I, PAUL G. L. G. DESIGNOLLE, of Paris, France, have invented certain new and useful Improvements in Process of Treating Mineral Phosphates, of which the following is a specification:

This invention relates to the treatment of mineral phosphates for agricultural and industrial purposes; and it consists in, first, the employment of sulphurous acid, with a view, on the one hand, to eliminate carbonate of lime, and on the other, to extract phosphoric acid in the shape of monobasic phosphate of lime in solutions; second, the treatment of such solutions with a view of preparing either bibasic phosphate of lime or superphosphates or phosphorus.

The process is mainly based upon the mode of action of sulphurous acid, according to its being used either in closed vessels under high pressure or in open vessels at the ordinary atmospheric pressure.

In the first case, the sulphurous acid dissolves carbonate of lime, and deprives the insoluble tribasic phosphate of two equivalents of lime, and transforms the same into a soluble monobasic phosphate. This reaction may be expressed by the following formula: $PhO_5$, $3CaO + n$, $(CaO,CO_2) + n + 2(SO_2) + n(HO) = PhO_5, CaO, 2HO + n + 2(CaO, SO_2) + n(CO_2) + n - 2(HO)$.

In the second place, the sulphurous acid will remove the carbonate of lime, leaving the tribasic phosphate intact, as shown by the following formula: $PhO_5, 3CaO + n(CaO,CO_2) + n(SO_2) = PhO_5, 3CaO + n(CaO,SO_2) + n(CO_2)$.

In either case a sub-product of sulphite of lime is obtained, which is already employed in certain manufactures, and is susceptible of more extensive applications.

The first mode of treating has reference to natural phosphates containing twenty-five per cent. of carbonate of lime, whose gangue is almost entirely insoluble in sulphuric acid.

The second mode has for its object the enriching of the natural phosphates designated under the name of phosphated chalks—that is to say, poor rocks containing from twenty to twenty-five per cent. of phosphate, the balance being formed exclusively of carbonate of lime.

It will be understood that the carbonate of lime, which may attain the proportion of seventy per cent., on being transformed into a soluble sulphite, a tribasic phosphate will remain, which is almost pure, or at least to the proportion of ninety per cent. It is further understood that these phosphates, thus enriched, as well as all the varieties of natural phosphates, whether rich or poor, may be treated with sulphurous acid at high pressure, in order to be transformed into monobasic phosphate in solution, and by this means further the manufacture of superphosphates or of bibasic phosphate of lime, or, again, of phosphorus, as will be hereinafter described.

Having thus summarily indicated the object of my invention, I shall now proceed to describe the manner in which the same is or may be carried into effect. The mineral phosphates or phosphated rocks, whatever may be their nature and their richness in phosphate, are coarsely broken up, and put into a receiver or closed vessel of cast-iron, in which vessel they are attacked by means of a saturated solution of sulphurous acid. A plunger, actuated by steam, alternately rises and falls within the receiver, in order to constantly vary the height of the liquid, and thus to renew the surfaces of contact, and increase the action and detach the insoluble matters which are collected in the bottom of the receiver. This operation is necessarily effected under pressure, in consequence of the emission of carbonic-acid gas. When the sulphurous acid is saturated and transformed into sulphite of lime, the liquid is allowed to run out of the receiver, (care being taken to collect it,) and is replaced by a fresh solution of sulphurous acid.

The operation may thus be continued indefinitely by replacing from time to time the phosphated rock, which is dissolved and carried off with the acids. On leaving the receiver the liquids are collected in a series of wooden tubs, where they are allowed to deposit the sand and clay which are carried along mechanically. These tubs are arranged in gradients, so as to allow of the successive overflow and consequent easy and rapid clarification of the liquid. The clear liquids, containing only sulphite and monobasic phosphate of lime in solution, are poured into suitable receivers, and boiled by means of steam admitted into jackets or pipes.

This operation has for its object the elimination of the sulphite of lime, which precipitates, in the shape of small white crystals, as fast as the excess of sulphurous acid is expelled from the liquid by the action of heat. The excess of sulphurous acid being thus driven off, (which is easily ascertained by the odor,) the liquid is allowed to cool. It is then separated from the sulphite of lime by pouring off the clear liquid, and then by centrifugal machines, and thus a solution will be obtained which contains but monobasic phosphate of lime. This is the solution which is used in the preparation of superphosphates, of bibasic phosphate of lime, and of phosphorus.

I shall now proceed to examine these three manufactures in the order stated.

First. To prepare superphosphates containing from twenty to twenty-two per cent. of phosphoric acid, soluble in water, I concentrate, by evaporation, in suitable apparatus, the monobasic phosphate of lime, obtained as above, until it acquires sirupy consistency, say of 45° to 50° Baumé. Whatever may be the degree of the solutions, (and they may and should vary according to the richness of the superphosphate to be obtained,) plaster-of-paris is incorporated therein in sufficient quantity to absorb the excess of water and solidify the mass. In about twenty-four hours the mass becomes dry and brittle, and may thus be reduced or divided with the utmost facility.

To avoid the formation of bibasic phosphate of lime, which is insoluble in water, it is necessary to use plaster which is free of carbonate of lime; but if such cannot be obtained a small quantity of sulphuric acid should be added to the solution of monobasic phosphate—a quantity proportionate to the quantum of carbonate lime contained in the plaster—which is thereby converted into sulphate of lime, and thus obviates retrogradation of soluble phosphoric acid.

This process of manufacture of superphosphates offers the following advantages: First, utilization of phosphated rocks, however small the quantity of phosphoric acid contained therein may be, the composition of the product obtained being wholly independent of the nature or richness of the rocks; second, facility to establish works in the locality where the phosphates are extracted, thereby saving cost of transportation; third, dispensing with the use of sulphuric acid, which is inconvenient, dangerous, and costly; fourth, dispensing with the pulverization of the mineral phosphates; fifth, incorporation of sulphate of lime in the form of plaster-of-paris, the cost of which is much less than that obtained by means of sulphuric acid by processes in use for the manufacture of superphosphates; sixth, the obtaining, as a sub-product, of the sulphite of lime, which is being used in various manufactures; seventh, the production of superphosphates in which all the phosphoric acid is soluble in water, and not susceptible of retrogradation even after the lapse of several years.

Second. The solution of monobasic phosphate of lime may be precipitated by means of lime-water. This can be done at the ordinary temperature; but I deem it preferable to boil the solution by means of jets of steam admitted to and through the mass, and to add afterward sufficient quantity of lime in powder, which will precipitate all the phosphoric acid as a bibasic phosphate of lime.

Third. It was recently attempted to manufacture phosphorus from mineral phosphates; but the manufacture had to be abandoned because of the difficulty or impossibility of obtaining rich phosphates, containing seventy-five to eighty per cent., at a reasonable price. The use of my process renders this manufacture possible and profitable with phosphated rocks so poor as containing but five per cent. of phosphoric acid.

The application of my process to this manufacture, therefore, presents the following advantages: First, utilization of poor phosphates; second, avoidance of treatment by sulphuric acid; third, avoidance of repeated filtrations having for their object the elimination of sulphite of lime; fourth, simplification in the operation in so far as the liquids treated upon contain neither sulphur nor sulphuric acid, the elimination of which always presents serious difficulties.

The mode of treatment of mineral phosphates by means of sulphurous acid at the normal pressure of the atmosphere, whose object is the increase of the relative proportion of the tribasic phosphate of lime, in consequence of the elimination of carbonate of lime with which it is combined, is applicable only to certain varieties of natural phosphates—i. e., such in which the carbonate of lime predominates. These phosphates are known as "carbonated phosphated limes" or "phosphated chalks."

To separate the carbonate of lime and to leave the tribasic phosphate in accordance with the formula hereinbefore given, I proceed as follows: The phosphated rock is mechanically pulverized, and put through a fine screen or sieve. If the mineral contain sufficient carbonate of lime this operation can be dispensed with, as by roasting or burning (as that is done with lime) a product is obtained which, like lime itself, disintegrates in contact with water. In such case the mineral, after roasting, is hydrated until it is reduced to powder. It is then screened through a wire-cloth to separate therefrom foreign bodies, which are mostly composed of gravel or stones of silex. The matter thus reduced to powder, by either of the processes described, is treated in wooden vessels provided with mechanical stirrers, by means of a solution of concentrated sulphurous acid.

Carbonate of lime dissolves, setting free carbonic gas and becoming soluble sulphite of lime. The tribasic phosphate of lime precipitates to the bottom of the vessel, whence it is collected. The washing and drying of the tribasic phosphate, as well as the treatment of the liquids charged with the sulphite of lime, are effected in the same manner as is done by the process previously described, using sulphurous acid under pressure. In this way a product is obtained which, according to the composition of the mineral, yields from eighty to ninety-five per cent. of tribasic phosphate which is entirely free from carbonate of lime.

Thus far I have described the use of sulphurous acid in the shape of aqueous solution; but, by obvious modifications of apparatus, and according to circumstances, sulphurous acid may be used either in the liquefied or the gaseous form.

I would observe, also, that the process based upon the action of sulphurous acid is applicable to the treatment of minerals and ores which are carbonates or oxides, either to isolate and separate the utilizable base of a mineral oxide or carbonate, and to free it of gangues insoluble in sulphurous acid, or to set free certain matters insoluble in sulphurous acid which are found in and mixed with a mineral carbonate or oxide.

Having thus described my said invention, and the manner in which the same is or may be carried into effect, I would observe that I am aware that bone phosphates have been treated for various purposes by means of sulphurous acid; but I am not aware that mineral phosphates have been treated in the manner or for the purposes hereinbefore described. Therefore,

What I claim, and desire to secure by Letters Patent, is—

1. The process herein described of eliminating carbonate of lime and of enriching poor mineral phosphates, also of transforming tribasic phosphate of lime into monobasic phosphate in solution by the employment of sulphurous acid, either in closed vessel under pressure or in open vessel, substantially as herein described.

2. In the manufacture of rich superphosphates, treating monobasic phosphate in solution, previously concentrated by evaporation by means of burned gypsum or plaster-of-paris, substantially as herein described.

3. In the manufacture of phosphorus, the use and application of solutions of monobasic phosphate of lime obtained by the sulphurous-acid treatment, substantially as herein described.

DESIGNOLLE.

Witnesses:
DUMAS,
A. STROTT.